Aug. 24, 1954   R. A. CHRISTIAN ET AL   2,687,252
PRINTING CONTROL MECHANISM FOR ACCOUNTING MACHINES
Original Filed Dec. 6, 1947   7 Sheets-Sheet 1

INVENTORS
RAYMOND A. CHRISTIAN
PAUL H. WILLIAMS

BY Earl Beust
Richard Van Buren
THEIR ATTORNEYS

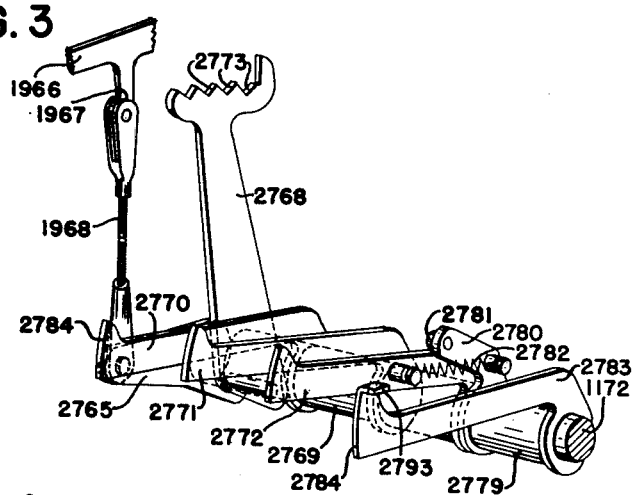
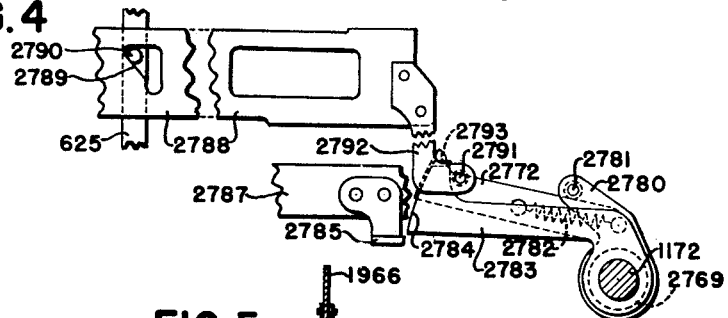
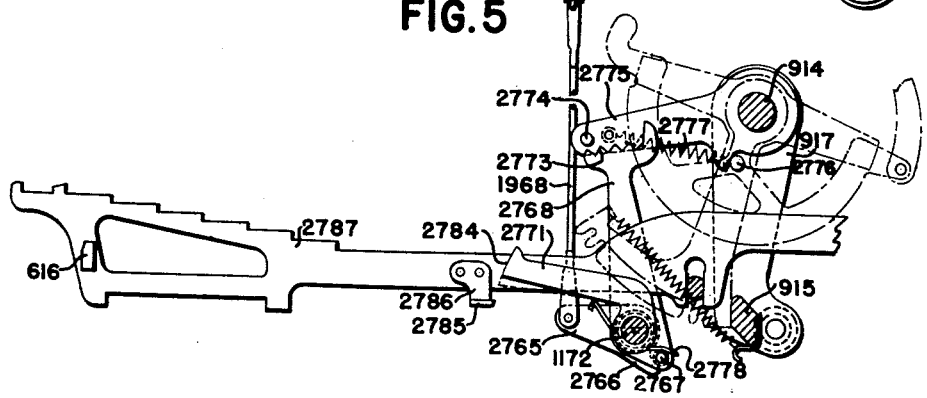

Aug. 24, 1954    R. A. CHRISTIAN ET AL    2,687,252
PRINTING CONTROL MECHANISM FOR ACCOUNTING MACHINES
Original Filed Dec. 6, 1947    7 Sheets-Sheet 3
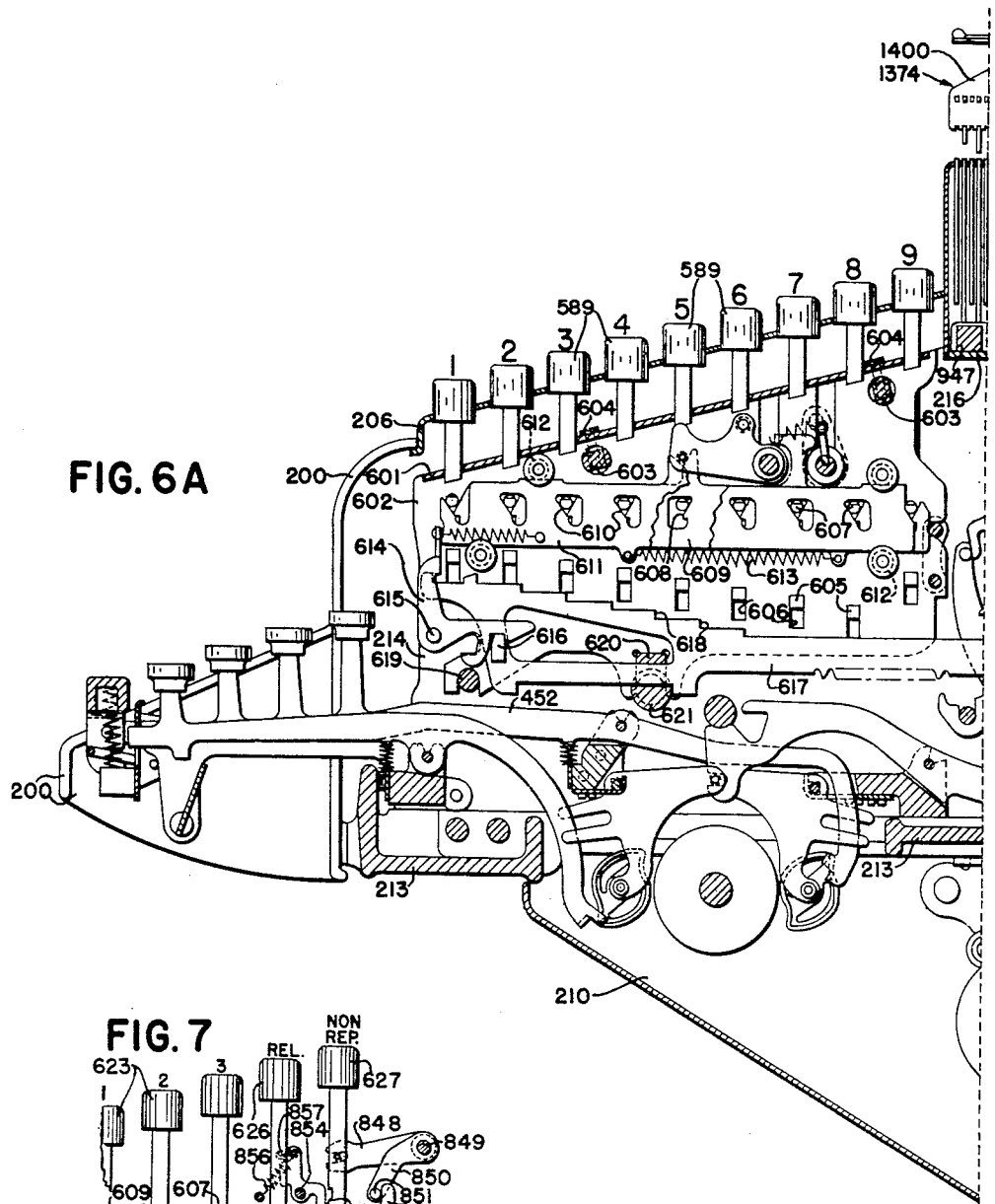
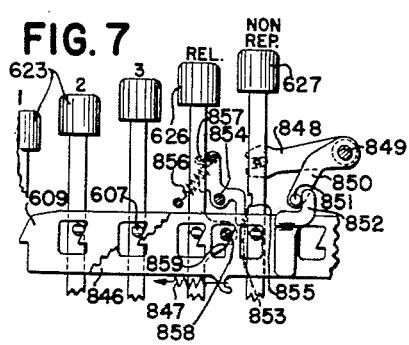
INVENTORS
RAYMOND A. CHRISTIAN
PAUL H. WILLIAMS
BY
THEIR ATTORNEYS Aug. 24, 1954  R. A. CHRISTIAN ET AL  2,687,252
PRINTING CONTROL MECHANISM FOR ACCOUNTING MACHINES
Original Filed Dec. 6, 1947  7 Sheets-Sheet 4

INVENTORS
RAYMOND A. CHRISTIAN
PAUL H. WILLIAMS

BY Earl Beust
Richard Van Buren
THEIR ATTORNEYS

Aug. 24, 1954   R. A. CHRISTIAN ET AL   2,687,252
PRINTING CONTROL MECHANISM FOR ACCOUNTING MACHINES
Original Filed Dec. 6, 1947   7 Sheets-Sheet 5

INVENTORS
RAYMOND A. CHRISTIAN
PAUL H. WILLIAMS
BY *Earl Berst*
*Richard Van Buren*
THEIR ATTORNEYS

INVENTORS
RAYMOND A. CHRISTIAN
PAUL H. WILLIAMS

THEIR ATTORNEYS

Aug. 24, 1954    R. A. CHRISTIAN ET AL    2,687,252
PRINTING CONTROL MECHANISM FOR ACCOUNTING MACHINES
Original Filed Dec. 6, 1947    7 Sheets-Sheet 7
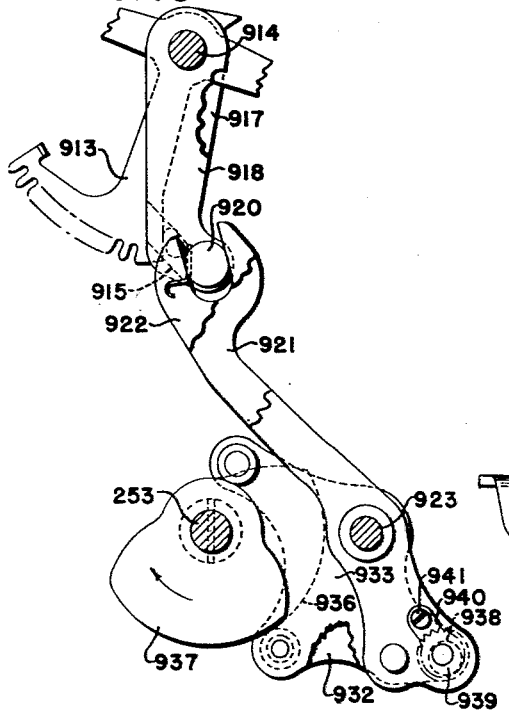
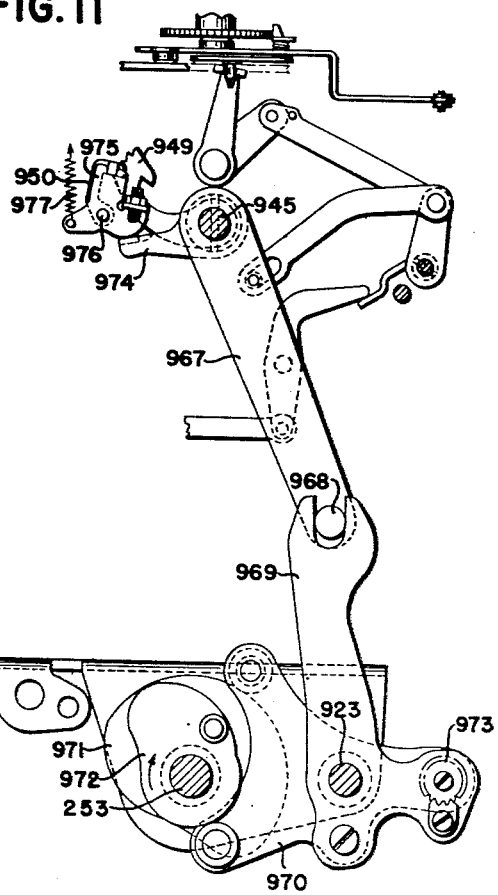
INVENTORS
RAYMOND A. CHRISTIAN
PAUL H. WILLIAMS
BY Karl Berest
Richard Van Busum
THEIR ATTORNEYS Patented Aug. 24, 1954

2,687,252

UNITED STATES PATENT OFFICE 2,687,252

PRINTING CONTROL MECHANISM FOR ACCOUNTING MACHINES

Raymond A. Christian and Paul H. Williams, Dayton, Ohio, assignors to The National Cash Register Company, Dayton, Ohio, a corporation of Maryland Original application December 6, 1947, Serial No. 790,032, now Patent No. 2,626,749, dated January 27, 1953. Divided and this application May 27, 1952, Serial No. 290,174

10 Claims. (Cl. 235—60.47)

The present invention relates to calculating machines and particularly to machines of the accounting or bookkeeping type which are provided with a traveling paper carriage for supporting the bookkeeping forms and also for automatically controlling the various functions of the machine in accordance with the columnar positioning thereof.

This application is a division of the co-pending application for United States Letters Patent filed on December 6, 1947, by Raymond A. Christian et al., Serial No. 790,032, now United States Patent No. 2,626,749.

In the business world of today, there are nearly as many different types of bookkeeping systems employed as there are separate business organizations. It has, therefore, been necessary for the builders of bookkeeping or accounting machines to modify the designs of their machines frequently in order to adapt them to the particular bookkeeping system employed by the prospective purchaser. These so-called "customer order" machines are costly to build, since certain portions of the machine must be practically hand-made in order to furnish a machine having the desired characteristics. Accordingly, it is an object of the present invention to provide a solution to this problem of adapting a particular type of accounting machine to fit the bookkeeping system utilized by any particular customer. This has been done in the present instance by designing an accounting or bookkeeping machine which is sufficiently flexible in character that it may be used in connection with practically any of the complex accounting systems used by present-day business establishments.

Another problem confronting both the manufacturers and the users of accounting machines is the complexity of many of our present bookkeeping systems. Not only is it difficult to construct machines which are capable of performing the many and complicated operations involved, but it is also difficult for the operator of the machine to learn how to manipulate the various controls of the machine so as to properly perform the various operations involved in making an entry on the books. It is, therefore, a further object of the invention to provide a bookkeeping machine which will perform most of these operations automatically and therefore require a minimum amount of time and attention on the part of the operator of the machine.

In order to better enable the machine embodying the present invention to handle the complicated present-day bookkeeping procedures, it is provided with a large number of totalizers which may be selected simultaneously in various combinations for either addition or subtraction, so as to enable postings to be made into a large number of separate accounts during a single machine cycle.

A further object of the invention resides in the provision of a simplified type of front-feed paper carriage. This carriage is driven in both its forward direction and its reverse direction by a hydraulic drive mechanism which is operated by the same motor which serves to drive the main operating mechanism of the machine.

Another object of the invention resides in the provision of novel means for controlling the various functions of the machine either from the traveling paper carriage, from the several motor bars for initiating cycles of operation of the machine, or from certain of the manipulative keys situated on the keyboard of the machine.

Another object of the invention is to provide a novel mechanism for printing function-identifying symbols after the various numerical entries, together with means for enabling this mechanism to be disabled at the option of the operator under certain conditions.

Another object of the invention is the provision of date-printing mechanism which is controlled in its operation by the traveling carriage in predetermined columnar positions thereof.

An additional object of the present invention is to provide a bookkeeping machine which is designed and constructed in such a manner as to facilitate both the assembly of the machine in the factory and also the repair of the machine by service men in the field. For this reason, the various components of the machine, such as the printer, the totalizers, the motor bar mechanism, the tabulating mechanism, etc., are designed as self-contained units which may be assembled into the machine or removed therefrom as a single piece. In addition, the traveling carriage is supported on the side frames of the machine rather than on the cabinet, so that the latter may be removed without affecting the carriage. The cabinet is furthermore made up of a number of separate sections which may be individually removed in order to provide access to the parts of the machine lying thereunder.

A further object of the invention resides in the provision of the various interlocks and control devices which are necessary in order to insure the proper operation of the machine and its various component mechanisms despite the inexpert handling thereof by an unskilled operator.

With these and other object in view which will become apparent from the following description, the invention includes certain novel features of design and combinations of parts, a preferred form or embodiment of which is hereinafter described with reference to the drawings which accompany and form a part of this specification.

In the drawings:

Figure 3 is a perspective view of a portion of the date-printing control means.

Figure 4 is a detail view of a portion of the mechanism associated with the date-printing control means.

Figure 5 is a right side view of the date-printing control mechanism.

Figure 6B:
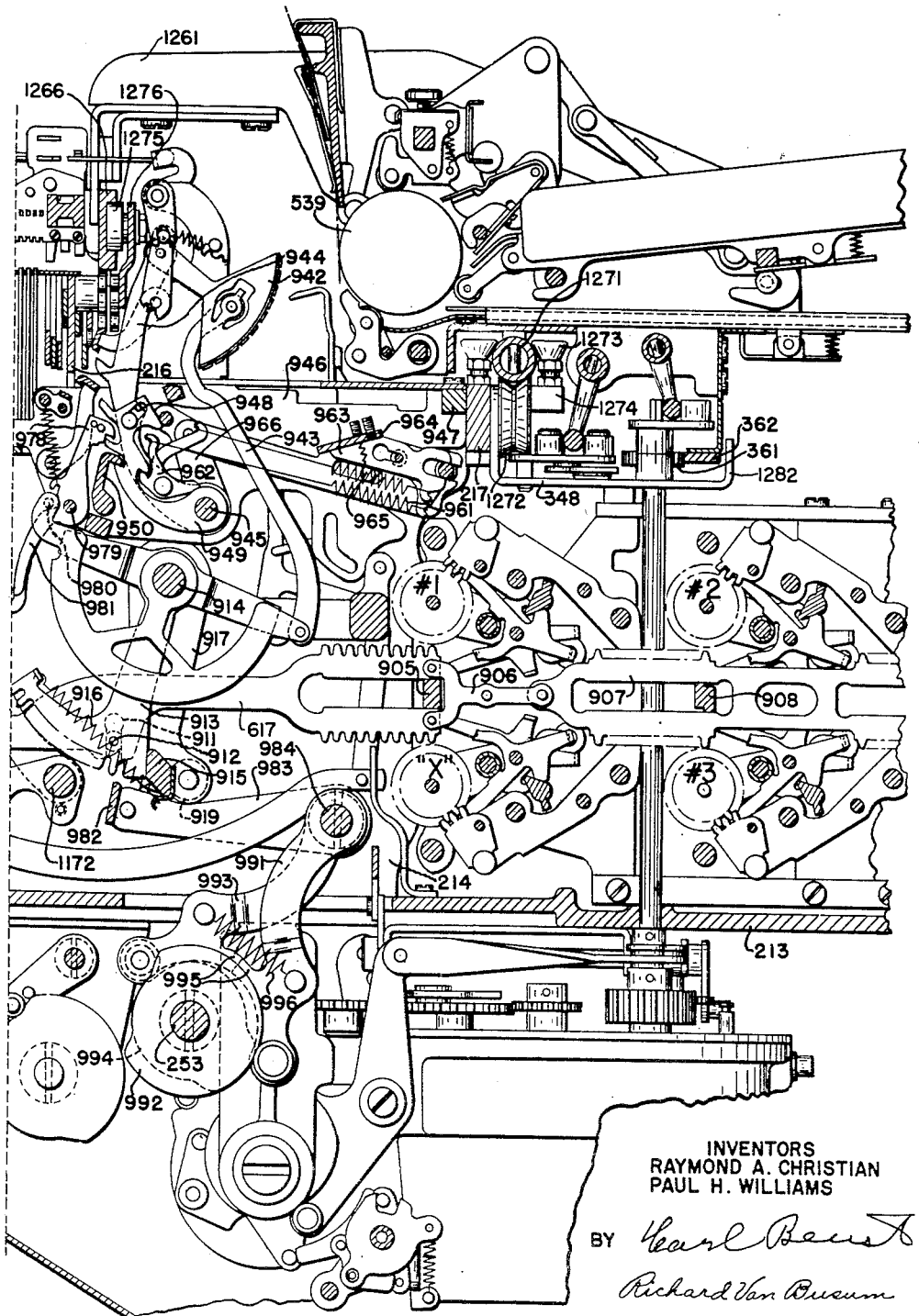

Figures 6A and 6B, taken together, constitute a longitudinal sectional view taken just to the right of one of the amount banks.

Figure 7 is a right side elevation of the non-repeat mechanism provided in connection with the date keys.

Figure 8:
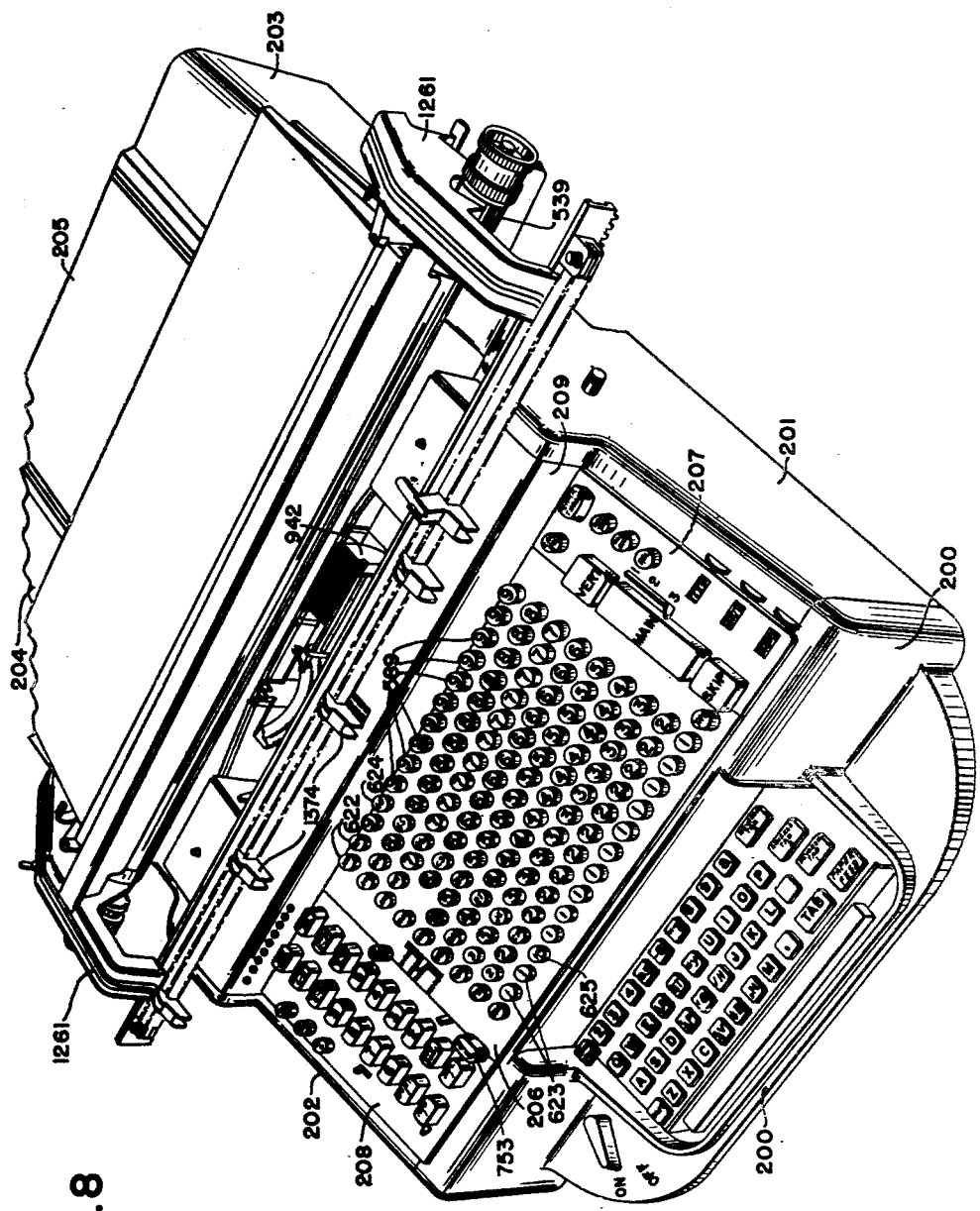

Figure 8 is a perspective view of the complete machine.

Figure 9:
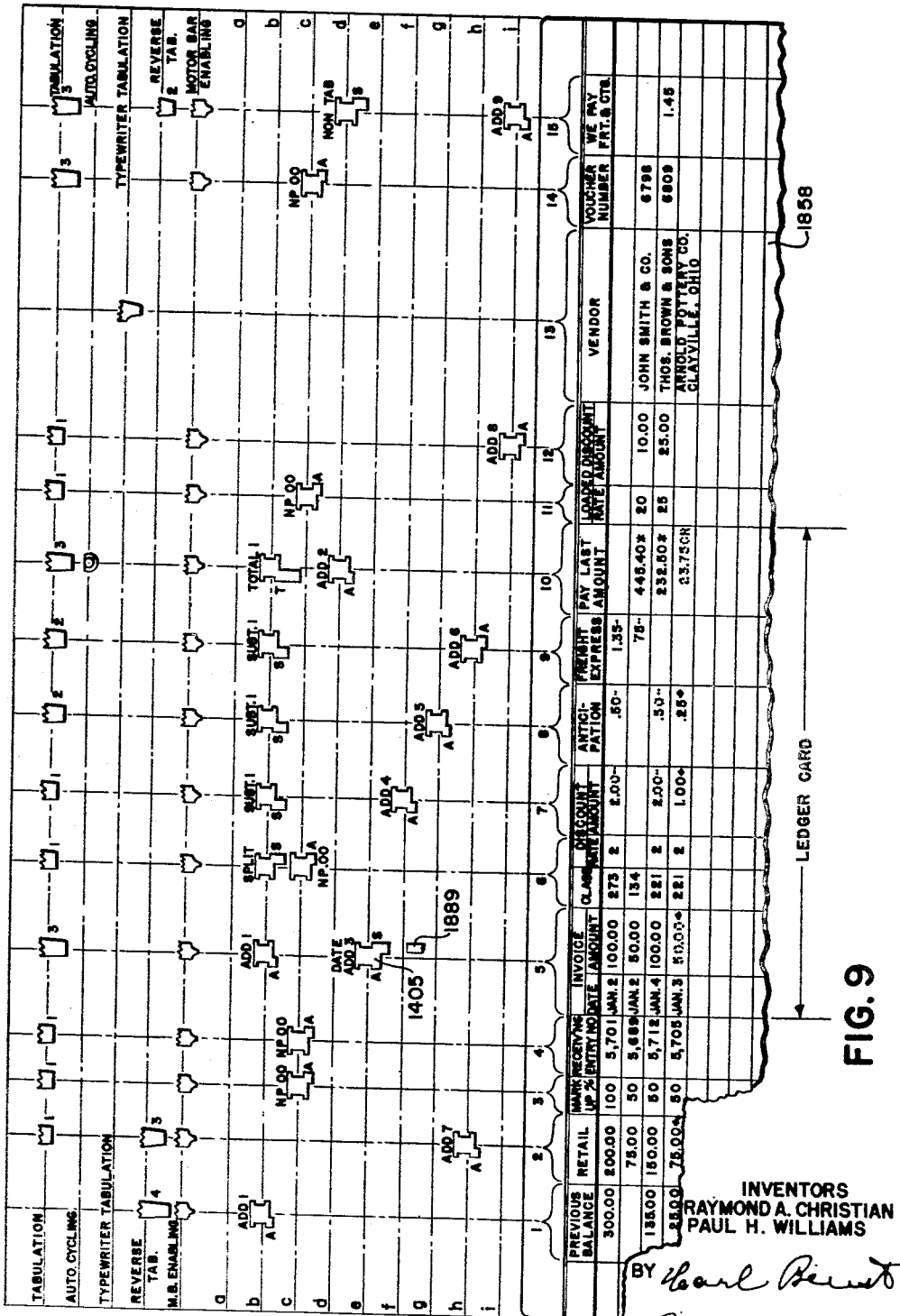

Figure 9 is a composite view showing a facsimile of a journal sheet on which various numerical and typewritten entries have been made by a machine of the type presently being described, and also showing in a schematic fashion the makeup of the carriage stops in each of the various columnar positions.

Figure 10 is a right side view of the driving mechanism for the differential actuators.

Figure 11 is a right side view of a part of the printer-operating mechanism.

GENERAL DESCRIPTION

Certain of the principles and features of the machine hereinafter to be described are disclosed in the following United States patents:

1,197,276, September 5, 1916, Halcolm Ellis
1,203,863, November 7, 1916, Halcolm Ellis
1,819,084, August 18, 1931, Emil John Ens
2,038,717, April 28, 1936, Raymond A. Christian
2,079,355, May 4, 1937, Charles L. Lee
2,181,975, December 5, 1939, Charles L. Lee
2,189,851, February 13, 1940, Paul H. Williams et al.
2,217,221, October 8, 1940, Jesse R. Ganger
2,243,806, May 27, 1941, Laurence N. Lehman
2,316,520, April 13, 1943, Henry F. Lang
2,442,402, June 1, 1948, John T. Davidson et al.

The basic structure of the present machine is patterned after the machine shown in the foregoing patents, which has been on the market for many years. For example, the construction and arrangement of the keyboard, the differential actuators, the printer, and the totalizers are practically identical with the corresponding mechanisms shown in the patents. The basic structure of the prior art machine is disclosed in the Ellis Patent No. 1,197,276, while an add-subtract totalizer of the same general type as that used in the present machine is disclosed in Ellis Patent No. 1,203,863. The totalizer-engaging and -disengaging mechanism, on the other hand, is shown in the Davidson et al. Patent No. 2,442,402. Most of the mechanisms for controlling the various machine functions, however, are new in the subject machine, as are also the paper carriage and the controlling mechanisms therefor. In addition, the instant machine is equipped with an electric typewriter which is driven by the same motor that operates the remainder of the machine. With this brief, overall description in mind, the various parts of the machine will now be described in detail, so as to provide a full and complete understanding of the entire device.

General organization and cabinet (Figure 8)

A perspective view of the machine as a whole is shown in Figure 8 of the drawings, and a general understanding of the layout and organization of the machine may be obtained from this illustration. As shown herein, a typewriter keyboard is located at the front end of the machine, while just behind and somewhat above this keyboard is an amount keyboard on which may be set up the various amounts which are to be entered in the accounting machine. To the left of the amount keyboard is a control keyboard containing the various function control keys, while to the right of it are located a plurality of motor bars and carriage control keys. In the center, just above the amount keyboard, are a group of type sectors for the accounting machine, while just to the left of these sectors is located a type basket for the electric typewriter. Immediately behind the aforementioned printing mechanism is a rotatable platen in which accounting forms and/or other record material may be supported, this platen being mounted on a traveling carriage which is movable back and forth across the machine. Behind the paper carriage is shown that part of the machine cabinet which houses the add-subtract totalizers. At the front of the machine, just to the left of the typewriter keyboard, is a switch lever for starting and stopping a continuously-running electric motor, which drives the various operating mechanisms of the machine.

As shown in Figure 8, the operating mechanism of the machine is housed in a cabinet made up of several separate sections, each of which is independently removable in order to yield access to the part of the machine lying thereunder. This cabinet is composed of a front piece 200, extending across the front of the machine and having a central opening therein for accommodating the keys of the typewriter mechanism. On either side of the machine are side plates 201 and 202, immediately behind which are additional side plates 203 and 204, which cover the sides and part of the top of the totalizer section of the machine. The top of the totalizer section is further covered by a plate 205, which also extends down over its rear end and, together with similar downwardly-extending portions on side pieces 203 and 204, serves to cover the rear of the machine.

The thus-constituted accounting machine cabinet is further complemented by keyboard cover plates 206, 207, and 208, which are provided with apertures through which extend the upper ends of barrel-type key caps. To the rear of the keyboard and extending across the machine between the side pieces 201 and 202 is an angular strip of metal 209, which encloses a carriage control mechanism which will be described in detail in a subsequent portion of this description.

Framework (Figures 6A and 6B)

The principal element of the machine frame is a cast iron base 213, which supports, either directly or indirectly, all of the various mechanisms going to make up the present machine. This base is generally rectangular in shape and is provided with various ribs, pads, bosses, and cut-outs for accommodating all of the various structures supported thereon or depending therefrom. Mounted on top of the base toward the front of the machine are a left side frame 214 (Figures 6A and 6B) and a right side frame (not shown). Extending between the upper portion of the side frames and connected thereto is an angle bar 216, which serves to support the forward part of the carriage as well as the carriage control mechanisms cooperating therewith. Located behind the angle bar 216 and supported by the side frames is a rail 217 for supporting the rear portion of the carriage. The angle bar 216 and the rail 217 are secured to the side frame 214 by suitable screws. The base, the side frames, and the cross pieces for supporting the carriage constitute the main framework of the machine, although there are various sub-frames secured in a suitable manner to the main frames for supporting the various operating mechanisms of the machine.

Figure 1:
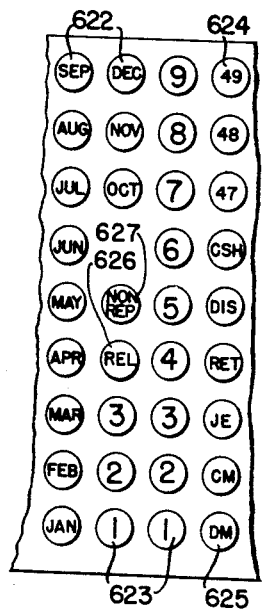
Figure 1 is a plan view of a fragmentary portion of the adding machine keyboard, showing the date keys and the symbol keys.

Amount keys (Figures 1, 6A, and 8)

Situated between the side frames, toward the front of the machine, is an amount keyboard similar to that disclosed in the United States patent to Paul H. Williams et al., No. 2,189,851, modified in accordance with the teachings of United States Patent No. 2,316,520, issued to Henry F. Lang.

Referring to Figures 1 and 8, it will be observed that in the present construction there are ten rows of amount keys 599 and four rows of date and symbol keys 622–625, all of which are mounted in a removable keyboard framework. This framework comprises a top plate 601 (Figure 6A), a partition plate 602 for each denominational row of keys, and flattened rods 603, which pass through elongated apertures formed in the partition plates. The top plate 601 is secured to the rods 603 by means of screws 604, thereby fastening the partition plates 602 to the top plate 601. The top plate rests on inclined surfaces formed on the side frames and is secured in position thereon by means of screws. Removal of these screws enables the amount keyboard to be removed from the machine as a unit in case such removal becomes necessary or desirable.

Each of the partition plates 602 supports one denominational row of amount keys 599, and, inasmuch as every bank of amount keys is identical with every other bank, and the date and symbol banks are similar to the amount banks, it is believed that a description of the amount key bank shown in Figure 6A will suffice for all.

The upper ends of the key stems for the amount keys 599 are slidably supported in suitable slots provided therefor in the top plate 601, as well as by ears bent off from the upper edge of the partition plate 602. The lower ends of the key stems are slidably supported in the partition plate 602 by square studs 605 secured to the lower ends of the stems and extending through elongated slots 606 provided in the partition plate. Near the center of each of the key stems is a stud 607, which is flattened on top for cooperating with teeth 608 formed on a latching slide 609 and also with cam faces 610 on a control slide 611. The slides 609 and 611 are supported on rollers 612 carried by studs secured to the partition plate 602 and are urged in opposite directions into engagement with the studs 607 by a spring 613 connected between the slides. Hence, when an amount key is depressed, the slide 611 will be moved forwardly by means of the stud 607, while the key will be latched in depressed position by the latching tooth 608 moving over the flattened surface of the stud 607. Forward movement of the slide 611 will cause a zero stop pawl 614 to be rocked counterclockwise about its pivot 615, thereby releasing the block 616 secured to a differential actuator 617. The actuator 617 will thus be permitted to move toward the rear of the machine until one of the shoulders 618 formed thereon engages one of the square studs 605 to stop the rack after it has moved a distance commensurate with the value of the key depressed.

The partition plates 602 are supported and braced at the bottom by means of a round bar 619, extending between the side frames, and also by a square bar 620, secured on top of a round bar 621, also extending between the side frames. The bars 619 and 621 are grooved at intervals corresponding to the spacing between partition plates 602, so as to receive the bottoms of the plates and prevent any sidewise displacement thereof.

Date and symbol keys (Figure 1)

Immediately to the left of the amount keys 599 are four rows of date and symbol keys including month keys 622, day keys 623, year keys 624, and symbol keys 625. As shown in Figure 1, there are twelve month keys 622, nine of which are located in one row and the remaining three in a second row. These keys control a single differential actuator 617, which is capable of receiving twelve steps of movement and which controls the positioning of a type sector bearing twelve month type. This structure is not shown in the present drawing, and, for further information regarding details thereof, reference may be had to Figures 1, 4, and 5 of United States Patent No. 2,127,673, issued to Raymond A. Christian on August 23, 1938.

There are also two rows of day keys 623, three of which are tens of days keys and are located in one row, and nine of which are units of days keys and are located in a second row. The key banks for these two rows of keys are of standard construction, except that the key bank containing the tens of days keys also contains three month keys, a "Release" key 626, and a "Non-repeat" key 627. These keys, however, are merely supported therein and do not cooperate with any of the mechanism pertaining to this key bank. The tens of days keys control a differential actuator for this bank, which is connected with and serves to position a type sector bearing the numbers "1," "2," and "3." The units of days keys cooperate with a differential actuator which is connected with and serves to position a type sector of standard design. Each of the year keys 624 and the symbol keys 625 is provided with its own separate latching slide 609 and also with its own individual control slide 611, so that the two sets of keys operate independently of one another. The year and symbol keys, however, cooperate with the same differential actuator to control the positioning of a type sector bearing nine type, three of which correspond to the designations on the year keys 624 and six of which correspond to the designations on the symbol keys 625.

Mechanism which functions automatically at the end of each machine operation is provided for releasing the depressed amount keys 589 near the end of adding and subtracting operations. In reading and resetting operations, the automatic key-releasing mechanism functions near the beginning of such operations to release any inadvertently depressed amount keys 589. In addition to the automatic key-releasing mechanism, the amount keys 589 (Figure 8) may be released manually, when desired, by depression of a release key 753, located just to the left of the month keys 622.

The date keys 622, 623, and 624 are normally "stay-down" keys; i. e., they are not ordinarily released at the conclusion of each machine cycle. However, if desired, these keys may be released at the end of each cycle, the same as the amount keys, by depression of the "Non-repeat" key 627.

Each of the key banks containing the date keys is provided with an extra or "special" latching slide 846 (Figure 7), which is pulled toward the front of the machine by a spring 847, so as to urge latching teeth formed thereon into engagement with the studs 607 on the keys.

The "special" slides 846 are arranged to be manually movable out of latching engagement with the studs 607 on the date keys by means of the "Non-repeat" key 627. The stem of this key bears a stud which cooperates with a bifurcation in the end of an arm 848 secured to a shaft 849 journaled in the partition plates of the date key banks. Also secured to the shaft 849 are four arms 850, one for each row or bank of date keys. Each of the arms 850 bears a stud 851, which is adapted to cooperate with a finger 852 mounted on each of the slides 846. Thus, when the key 627 is depressed, the slides will be moved rearwardly out of latching engagement with the keys. The "Non-repeat" key will be retained in its depressed position by a latch 853 pivoted on a stud 854 and urged into engagement with a notch 855 in the stem of the key 627 by a spring 856. Hence, the "special" latching slides 846 will be disabled, and the keys will be held down only by the regular latching slides 609, which are released automatically at the end of each cycle.

The "Release" key 626 bears a stud 857, which is adapted to engage a cam face formed on the latch 853 when the key 626 is depressed, thereby rocking the latch clockwise and releasing the "Non-repeat" key. The "Release" key also carries a stud 858, which engages a cam face 859 formed on each of the latching slides 609 and 846 for the four banks of date keys. Therefore, when this key is depressed, all of the latching slides for the date keys will be moved rearwardly, and any depressed date keys will thus be released.

The usual locking mechanism, which functions near the beginning of machine operations, is provided for locking the entire keyboard against operation the instant the machine is released for operation, and retaining said keyboard thus locked until near the end of machine operations.

*Differential actuators (Figures 6A and 6B)*

As previously mentioned herein, the differential actuators 617 are controlled by the studs 605 attached to the stems of the keys 589, which studs are adapted to engage one of the shoulders 618 formed on the actuator 617 when a key is depressed, to thereby limit the rearward movement of the actuator. As previously mentioned, the actuators are guided at their forward ends by a slotted bar 621, the actuators being retained within the slots in the bar by a square bar 620 fastened on top of the bar 621. As shown in Figure 6B, the actuators are guided at their rear ends by a slotted bar 905, supported between the side frames.

Each of the actuators 617 associated with an amount bank is connected by a link 906 to an auxiliary actuator 907, which is guided for sliding movement on slotted bars 908 (only one shown), which are supported between the side frames of the totalizers. In the case of the actuators 617 associated with the date and symbol key banks, there are no auxiliary actuators 907 connected thereto, inasmuch as these are merely printing banks and have no totalizer wheels associated therewith.

Each actuator 617 has a slot 911 for receiving a stud 912 mounted on a reducer arm segment 913, which is freely rotatable on a reducer arm shaft 914 journaled at either end in the side frames. The rear edge of each of the reducer arm segments 913 is urged into engagement with a leading frame bar 915 by a spring 916, connected between the segment and the bar. The bar 915 is supported between a pair of identical arms 917 and 918 (Figures 6B and 10), which are secured to the left- and right-hand ends of the reducer arm shaft 914, respectively, and are located just inside the side frames. The arms 917 and 918 have, on their lower ends, a similar rolls 920, which are adapted to engage bifurcations on a pair of cam follower arms 921 and 922. The right-hand arm 922 is journaled on a shaft 923, which is journaled at each end in brackets (not shown) secured to the lower side of the base 213. The left-hand follower arm 921 is pivotally mounted on a fixed stud (not shown), which is in axial alinement with the shaft 923. Each of the follower arms is adjustably attached to cam followers 932 and 933 (Figure 10), which cooperate with similar pairs of cams 936 and 937. As shown in Figure 10, the cam follower is pivotally supported on the shaft 923 beside the arm 922, and the two are adjustably connected by an eccentric 938 fastened to a notched disc 939, which is retained in position by a notched keeper 940 secured to the arm 922 by a screw 941. The follower 932 and the arm 921 are connected by a similar device, and hence the arms 921 and 922 may be adjusted to take care of any small misalinement of the cams on the cam shaft 253 or of the arms 917 and 918 on the shaft 914.

When the main cam shaft is rotated through one revolution, the arms 921 and 922 will be rocked first clockwise and then counter-clockwise about the shaft 923, as viewed in Figure 10, so as to cause the leading frame bar 915 to be moved first toward the rear of the machine and then back to its original position, as shown in Figure 6B. Hence, the differential actuators 617 will be yieldably urged toward the rear of the machine by the springs 916 in the first half of the machine cycle and then positively restored to their home positions by the bar 915 in the second half of the cycle.

*Printer (Figures 6B and 11)*

The resulting differential positioning of the reducer arm segment 913 (Fig. 6B) is transmitted to a type sector 942 by a link 943 connecting the segment with the type sector. The sector 942 is pivotally connected to the upper end of a printer arm 944 loose on a printer shaft 945, which is rotatably journaled at its right-hand end in the right side frame 215 and at its left-hand end in a printer side plate 946. This plate is secured by screws (not shown) to blocks 947, which are secured to the angle bar 216 and the rail 217. Connected to the arm 944 by a pin-and-slot connection 948 is a control plate 949 also loose on the shaft 945. Cooperating with a tooth formed on the plate 949 is a printer release trigger 950, which is adapted to be rocked counter-clockwise out of engagement with the tooth on the plate 949 so as to release the arm 944 to the action of a strong spring 961, which will cause the type sector 942 to be driven against the record material placed around the platen 539.

The spring 961 is connected to a pawl 962, pivoted on the arm 944, said pawl having a tooth which engages a similar tooth on the plate 949. The other end of the spring 961 is connected to an extension of an adjustable plate 963, which has a pair of slots which engage a pair of grooved rods so as to permit limited sliding movement of the plate 963. The rods are supported between the side arms of a yoke 964, which is slidably mounted between the printer side plates by a stud-and-slot connection 965. The plate 963 may be adjusted relatively to the yoke by a set screw located in the bail of the yoke, thereby enabling the tension of the spring 961 to be adjusted as desired. The side arms of the yoke 964 are pivotally connected at their forward ends to a pair of companion arms 966, which are secured to the printer shaft 945. Initial movement of the printer shaft 945 and the arms 966 in a clockwise direction will cause the yoke 964 to be shifted rearwardly to thereby increase the tension on the spring 961 before printing takes place, so as to insure a firm impression on the record material. Alternate printing arms are provided with a spring and a pawl identical with the spring and pawl 961, 962, while a second set of springs and pawls are provided which are offset from the springs and pawls 961 and 962 due to the limited space involved.

The mechanism for operating the printer shaft 945 is shown in Figure 11 and, as shown there, includes a printer arm 967, which is secured to the right-hand end of the printer shaft. Mounted on the lower end of the printer arm 967 is a pin 968, which is received within a bifurcation in an arm 969 journaled on the shaft 923. Also journaled on the shaft 923 beside the arm 969 is a cam follower 970, bearing rolls which cooperate with a pair of companion plate cams 971 and 972. In order to provide for adjustment of the arm 969 with respect to the follower 970, an eccentric connection 973, similar to that shown in Figure 10 and previously described herein, is provided. During a cycle of operation of the cam shaft 253, the arm 969 will be operated first counter-clockwise and then clockwise so as to cause the printer shaft 945 to be rocked first clockwise and then counter-clockwise, as viewed in Figure 11, on each cycle of the main cam shaft.

Secured to the printer shaft 945, just to the right of the printer mechanism, is an arm 974, which is adapted to cooperate with an adjusting screw mounted on the plate 975. The plate 975 is secured to the right-hand end of a shaft 976, journaled at either end in the printer side plates, and is urged clockwise, as viewed in Figure 10, by a spring 977. The printer release trigger 950 is likewise secured to the shaft 976 between the printer side plates, so that the shaft 945 is rocked clockwise, and the arm 974 will strike the adjusting screw in the plate 975 and cause the latter to be rocked counter-clockwise against the action of the spring 977, thereby causing the printer trigger to release all of the control plates 949 and so allow the type sectors 942 to be fired against record material on the platen 539.

When no amount key 589 is depressed, a tooth on a zero elimination pawl 978 (Figure 6B), pivoted on a rod 979, supported in the printer framework, cooperates with a corresponding tooth on the control plate 949, so as to retain the plate and the arm 944, and hence the sector 942, against printing movement when the release trigger 950 is moved counter-clockwise, as explained above. However, when an amount key is depressed, the actuator 617 will move rearwardly in the machine, thereby causing the reducer arm segment 913 to be moved out of its home position. This will cause a stud 980, mounted in an extension of the segment 913, to came down the tail 981 of the zero elimination pawl 978 and thus move the tooth on the pawl out of engagement with the corresponding tooth on the plate 949 and so permit the type sector 942 to make a printing stroke.

After the type sector 942 has been positioned and the leading frame bar 915 has completed its rearward movement, an aliner bar 982 (Figure 6B) is rocked into engagement with the alining notches on the bottom of the reducer arm segment 913, so as to aline the segments and the printing sectors in their adjusted differential positions. The aliner bar 982 is supported between a pair of similar arms 983 (only one shown) secured to an aliner shaft 984 journaled between the side frames. The aliner shaft 984 is adapted to be rocked first clockwise and then counter-clockwise, so as to move the aliner bar 982 into engagement with the notches on the segments 913 and then to disengage it therefrom. This accomplished by a cam follower arm 991, secured to the shaft 984 and carrying a roll which bears against the periphery of a plate cam 992 secured to the cam shaft 253. Loosely mounted on the shaft 984 is a second follower arm 993, carrying a roll which bears against a companion cam 994. The arms 991 and 993 have abutment portions 995, which are held tightly in contact with one another by a spring 996, stretched between the arms so as in effect to constitute a single follower arm having thereon two rolls for cooperating with the companion cams 992 and 994. However, if for any reason movement of the aliner bar 982 into the notches formed in the segments should be obstructed, the spring 996 will yield and prevent damage to the machine.

The present machine is provided with a laterally-shiftable traveling carriage 1261 (Figures 6B and 8) comprising a carriage framework which rotatably supports a platen roll 539 for presenting record material to the printing mechanism.

The carriage frame is supported for transverse sliding movement on the accounting machine frame by a tube 1271, secured to the under side of the L-bar 1265, in turn secured to said carriage frame, which tube cooperates with a series of grooved rollers 1272, which are rotatably mounted on the rail 217. The tube 1271 also cooperates with a series of conical rolls 1273, located on either side of the tube, those located at the forward side of the tube being mounted on the rail 217, and those located to the rear of the tube being mounted on posts 1274, secured to the rear side of the rail 217. The forward portion of the carriage is supported on rolls 1275, which are received within a groove formed in an I-bar 1266, secured to the carriage frame. As shown in Figure 6B, the rolls 1275 are rotatably mounted on a vertical frame plate 1276, which is secured to the vertical portion of the angle bar 216 by mounting posts and studs (not shown).

The carriage is yieldably driven in either direction across the machine by a gear 361 (see Figure 6B), which meshes with a rack 362, secured by screws or other fastening means to the carriage frame. Also secured to the opposite ends of the rack are a pair of limit stops (not shown), which cooperate with an upturned ear 1282 formed on a bracket 348 secured to the machine framework, so as to limit the lateral travel of the carriage and prevent it from moving off the ends of the guide rails.

The gear 361 is arranged to be rotated in either direction by a hydraulic drive mechanism driven by the usual electric motor (not shown), which drives all the mechanism of the machine. Hence, whenever the motor is operating, the carriage will be resiliently urged to move in either a left-hand direction or a right-hand direction across the machine.

ESCAPEMENT AND TABULATING MECHANISMS IN GENERAL

Inasmuch as the present machine is intended to function both as an ordinary typewriter and also as an accounting machine, it is necessary that means be provided for enabling the traveling carriage to be letter-spaced in a left-hand or forward tabulating direction under control of the typewriter mechanism. The letter-spacing movement of the traveling carriage is controlled by an escapement mechanism comprising escapement pawls and associated anti-rebound pawls, which coact with the teeth of a rack mounted on the forward edge of the traveling carriage framework. The typewriter mechanism actuates the escapement mechanism to permit the traveling carriage to escape one letter-space toward the left each time a typewriter key is operated.

The present machine is provided with a backspacing mechanism for letter-spacing the traveling carriage toward the right or in a reverse tabulating direction, and this mechanism likewise actuates the escapement mechanism to permit the back-spacing of said carriage. The traveling carriage is likewise arranged to be tabulated in either a forward direction or a reverse direction under influence of the adding or accounting machine mechanisms from one columnar position to any other columnar position, at the discretion of the operator. The operation of the tabulating mechanism renders the escapement mechanism ineffective during the time that the traveling carriage is moving in a forward or in a reverse tabulating direction.

Figure 2:
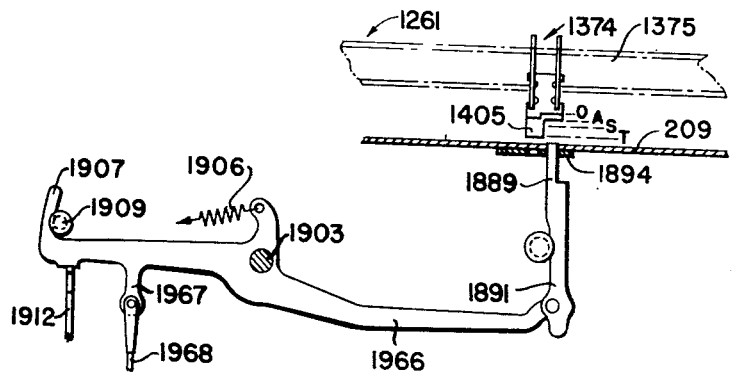
Figure 2 is a front elevation showing in detail the sensing mechanism for controlling the printing of the date.

In order to control the tabulating movement of the traveling carriage back and forth across the machine and also to enable the traveling carriage to control the various functions of the accounting portion of the machine, a series of carriage stops 1374 (Figs. 2, 6A and 6B) are removably secured to an I-shaped stop bar 1375, in turn removably attached to the framework of the traveling carriage.

Described in general terms, each of the stops 1374 comprises a stop block, which is machined from solid metal and has formed downward projections which form a forward tabulating stop, and a motor-bar-enabling lug. The block also has connected to its underneath side a reverse tabulation stop, which may be of varying lengths to control the tabulating movement of the traveling carriage in a reverse direction and an automatic cycling lug for initiating automatic operations of the machine controlled by the traveling carriage in preselected columnar positions thereof. Each of the stop blocks has secured to its sides, either by screws and nuts or by rivets, a pair of similar side plates 1400, each of which is provided with apertures and notches to receive lugs formed on the sides of function control plates 1405, which coact with corresponding sensing levers to control the functions of the accounting machine, including the automatic printing of the date in various columnar positions of the traveling carriage under control of said traveling carriage.

Each of the side plates for the stop 1374 has formed therein a corresponding notch, arranged to engage corresponding ones of a series of equally-spaced notches in the bar 1375 for properly locating said stops 1374 in relation to the desired columnar position of the traveling carriage. Each of the stops 1374 is provided with a finger-operated hook or latch, which engages a channel-shaped portion of the bar 1375 to retain said stops in proper location on said bar. As previously explained, the bar 1375 is removably connected to the framework of the traveling carriage, and said bar and all the stops thereon may be readily removed from the traveling carriage as a unit and another bar having stops arranged in proper sequence for a different business system may be substituted for the bar removed from the machine.

A suitable cover (not shown), which is removably connected to the bar 1375 (Figures 2 and 8), is provided for protecting the stops 1375 from duct and dirt and from catching on extraneous matter, such as the clothing of the operator, and also prevents tampering with the location of the stops by curious persons.

STOP SENSING MECHANISM

As mentioned earlier herein, substantially all of the functions performed by the machine of the present invention may be controlled by the traveling carriage in preselected columnar positions thereof through the medium of the stops 1374 and the sensing mechanisms coacting therewith.

The sensing mechanism for controlling the printing of the date includes a sensing finger 1889 formed on the upper end of a corresponding sensing member 1891, which is guided at its upper end by a corresponding slot formed in a guide plate 1894, secured to the angle bar 216 (Figure 6B). The lower end of the member 1891 is pivotally connected to the right-hand end of a sensing level 1966 (Figure 2), which is adapted to be controlled by the finger 1889 as the result of its engagement with corresponding ones of the stepped control plates 1405. The lever 1966 is pivotally mounted on a fixed stud 1903, and said lever is urged counter-clockwise by a spring 1906, so as to tend to move the sensing finger 1889 upwardly into sensing engagement with the corresponding plates 1405.

Near its left-hand end, the lever 1966 (Figure 2) has a guide finger 1907, which engages a corresponding annular groove in a stud 1909, secured in the machine framework. The sensing finger 1889 is normally maintained in its downward or ineffective position (as shown here), against the action of the spring 1906, by an operating plate 1912, shiftably mounted in the machine framework. Soon after the beginning of each machine operation, the plate 1912 is shifted downwardly, under influence of its cams, not shown, but fully illustrated and described in the parent application, Serial No. 790,032, now United States Patent No. 2,626,749, to which reference may be had for a detailed explanation of the mechanism described only in a general way herein. Counter-clockwise movement of the lever 1966 shifts the sensing finger 1889 upwardly into yielding engagement with the control edges of the plates 1495 arranged in the stops 1374 in relation to said sensing finger 1889. The control surfaces on the plates 1495 may be finished to any one of four different lengths, the "0" length being the equivalent of no plate 1495 at all, and in this case a shoulder on the right-hand end of the sensing finger 1889 contacts the bottom surface of the plate 1894 to position the lever 1966 and mechanism controlled thereby in relation to the zero position of the plate 1495. Following the "0" length in sequential order (Figure 2) are lengths A, S, and T, which, in connection with the accounting mechanism, refer, respectively, to Addition, Subtraction, and Total. Near the end of machine operation, after the sensing finger 1889 has properly controlled the function of the machine to which it applies, the plate 1912 is restored upwardly and carries the lever 1966 clockwise in unison therewith against the tension of the spring 1906 to restore said sensing finger 1889 downwardly to its normal or ineffective position, as shown here.

*Carriage control of the keyboard date mechanism*

As mentioned previously, the present machine is provided with month, day, and year keys 622, 623, and 624 (Figures 1 and 8), which may be used to set up dates for printing on the record material supported by the platen 539. It will be remembered that these keys are of "stay-down" construction, and the date would, therefore, be printed in every operation of the machine were it not for a date printing control mechanism, which is constructed and arranged to be controlled from one or more of the stops 1374, carried by the traveling carriage 1261. The finger 1889 (Figure 2) controls the date printing mechanism, an A length control plate 1495 causing the day only to be printed, an S length control plate causing the month and the day to be printed, and a T length control plate causing the month, the day, and the year to be printed on the record material.

The lever 1966 has formed thereon a depending lug 1967 (Figures 2, 3, and 5), to which is connected the upper end of the wire link 1968. The lower end of this wire link is pivotally connected to an arm 2765, which is loosely journaled on a rack control pawl shaft 1172, journaled in the frames 214, this arm being provided with a finger 2766, which contacts a stud 2767 secured to the lower end of an alining arm 2768. The arm 2765 is secured to the left-hand end of a tube 2769, to which tube are also secured rack control arms 2770, 2771, and 2772, as shown in Figure 3. The tube 2769 is freely rotatable on the shaft 1172 and is adapted to be held in adjusted position thereon by notches 2773 formed in the upper end of the alining arm, which notches cooperate with a stud 2774 mounted in the end of an arm 2775 loosely journaled on the reducer arm shaft 914. This stud is normally held out of engagement with the notches on the alining arm by a stud 2776 mounted in the arm 917, which stud engages with a shoulder on the arm 2775 and holds the latter in its raised position against the urgency of a spring 2777, stretched between the latter arm and the stud 2776. However, when the machine is cycled and the arm 917 is rocked counter-clockwise, the stud 2776 will move away from the shoulders and permit the stud 2774 to move down into engagement with the notches on the alining arm and hold it in its adjusted position. As shown in Figure 5, the finger 2766 is held in contact with the stud 2767 by a torsion spring 2778, so that the arm 2765 and the alining arm and tube 2769 normally move together as a unit. Hence, the rack control arms will be adjusted to different positions under the control of the sensing lever 1966, which in turn is controlled by the carriage stops 1374.

Also freely rotatable on the shaft 1172 is a sleeve 2779 (Figure 3), to the left-hand end of which is secured an arm 2780 bearing a stud 2781, which is urged into contact with the upper edge of the rack control arm 2772 by a spring 2782. Secured to the right-hand end of the sleeve 2779 is a year rack control arm 2783, which is thus flexibly connected with the tube 2769 and the other rack control arms and will be adjusted therewith under the control of the carriage stop. The forward end of each rack control arm is provided with an abutment face 2784, which is adapted to cooperate with a formed-over ear 2785 on a bracket 2786 (Figures 4 and 5) secured to each of month, day, and year actuators 2787. These actuators are similar in every respect to the amount actuators 617 except for the fact that they do not have an auxiliary rack 907 connected therewith and there are no totalizer wheels associated therewith.

The leftmost date actuator 2787 is controlled by the month keys 622 and bears one of the brackets 2786, which is adapted to cooperate with the abutment face formed on the forward end of the month rack control arm 2770. Just to the right of the month actuator is a tens of days actuator, which is controlled by the tens of days keys 623 and which bears one of the brackets 2786 cooperating with the tens of days rack control arm 2771. Just to the right of the tens of days actuator is a units of days actuator, which cooperates with the units of day keys 623 and bears one of the brackets 2786 for cooperating with the abutment face on the units of days rack control arm 2772. The next or extreme right-hand date actuator is controlled by the year keys 624 and the symbol keys 625 and is provided with one of the brackets 2786 for engaging the year rack control arm 2783. It is to be noted that the year rack control arm 2783 is displaced somewhat below the month rack control arm 2770, which latter arm is in turn displaced somewhat below the day rack control arms 2771 and 2772.

The operation of this mechanism is as follows: When a 0-length control plate or no control plate 1495 (Figure 2) is in position to stop the sensing finger 1889, the rack control arms will be moved all the way down, so as to prevent movement of all four date printing actuators 2787 (Figure 5) and hence prevent any date which may have been set up on the date keys from being printed on the record material. When an A-length control plate is in position above the sensing finger 1889, the year and month control arms 2783 (Figure 3) and 2770 will be lowered into position to block rearward movement of the year and month actuators, while the actuators for printing the units and tens of days will be free to move in accordance with the depressed day keys 623 to cause the day to be printed on the record material. When an S-length control plate is present, the month and day control arms 2770, 2771, and 2772 will be held above and out of the path of the ears 2785, so that only the year actuator will be blocked by the year rack control arm 2783. In this case, the month and the days will be printed on the record material, as shown in column 5, line e, of Figure 9. When a T-length control plate is present, all of the control arms will be held above the ears 2785, so as to enable the complete date to be printed.

Referring to Figures 1 and 8 of the drawings, it will be recalled that the year keys 624 are located in the same key bank with the symbol keys 625. The printing of the symbols is therefore under the control of the year actuator 2787, and, if this actuator is prevented from moving rearwardly by the blocking action of the rack control arm 2783, symbol printing would likewise be prevented. In order to obviate this difficulty, the mechanism shown in Figure 4 has been provided. As shown herein, a control slide or detent 2788 is provided in the key bank containing the year and symbol keys, this slide being provided with camming surfaces 2789, which are adapted to cooperate with studs 2790 secured in the stems of the symbol keys 625. Hence, whenever any one of these keys is depressed, the slide 2788 will be moved forwardly and cause a stud 2791, mounted on an extension 2792 secured to the rear end of the slide, to move beneath a formed-over ear 2793 on the year rack control arm 2783. Hence, if a symbol key is depressed when the rack control arms are adjusted under the influence of the sensing lever 1966 (Figure 2), the arm 2783 will be prevented from moving down in front of the ear 2785 on the year actuator, and the spring 2782 will be flexed to permit relative movement between this arm and the remainder of the rack control arms. In this manner, the desired symbol will be caused to be printed on the record material supported by the platen 539.

It is believed that a full understanding of the operation of the date printing control mechanism will have been obtained from a perusal of the preceding description. However, it may be of additional advantage to consider Figure 9, which shows a fragmentary portion of a journal sheet 1858 prepared on the machine embodying the present invention, and above said journal sheet is a chart showing the various control plates 1405 and other mechanisms associated with the stops 1374 (Figure 2) for controlling the entries in the various columnar positions. It will be noted that the month and the day are printed in column 5 of the journal sheet, and this printing is automatically controlled by the traveling carriage when it arrives at the fifth columnar position by means of the control plate 1405 located on line "e" of the chart (Figure 9), said control plate having an S-length control extension, which coacts with the finger 1889 to cause the month and the day only to be printed on the journal sheet 1858 each time the traveling carriage arrives in the fifth columnar position.

While the form of mechanism shown and described herein is admirably adapted to fulfill the objects primarily stated, it is to be understood that it is not intended that the invention shall be confined to the particular embodiments disclosed herein, but rather that it shall extend to all structures employing the principles taught herein.

What is claimed is:

1. In a machine of the class described, having four rows of depressible date keys, a differential actuator for each row of keys, movable from a home position to any one of a plurality of positions under control of the keys, and a traveling carriage movable from one columnar position to another, the combination of control elements mounted on the traveling carriage in predetermined columnar positions thereof, said control elements each having a stop surface of predetermined dimension thereon; means including a movable stop member for retaining each actuator in home position, said members being secured in fixed echelon or stepped relationship to each other; means to move the stop members from normal ineffective position so as to bring one after the other of said members into position to retain the corresponding actuators in home position; and sensing means connected to the stop members and coacting with the stop surfaces to selectively control the extent of movement of the stop members in relation to the actuators to determine whether all or part or none of said actuators will be positioned under control of the corresponding depressed date keys.

2. In a machine of the class described, constructed and arranged to print the date on record material, said machine having several rows of depressible date keys, an actuator for each row of keys, said actuators movable from a home position to positions corresponding to the depressed keys, printing sectors positioned by the actuators, and a traveling carriage for supporting the record material, said traveling carriage movable to various columnar positions, the combination of an abutment on each actuator; a stop member for coacting with each abutment, said stop members secured in echelon or stepped relationship to each other, and movable as a unit from normally ineffective position so as to bring one after the other of said members into the path of the corresponding abutments; a plurality of control elements mounted on the traveling carriage in relation to preselected columnar positions thereof; means connected to the stop members for sensing the control elements; and means to operate the sensing means and the stop members to cause said sensing means to sense the control elements and position the stop members accordingly to selectively retain predetermined ones of the actuators and printing sectors in home position when the corresponding date keys are depressed to control the printing of the date on the record material.

3. In a date-printing mechanism for accounting machines, for printing the year, month, and day on record material, said mechanism comprising depressible year, month, and day keys for setting up the date, year, month, and day, actuators movable from a home position to positions corresponding to the depressed date keys relating thereto, printing sectors operatively connected to the actuators and positioned thereby, and a traveling carriage for supporting the record material in printing relationship to the printing sectors, said traveling carriage movable to various preselected columnar positions to present different portions of said record material to said printing sectors, means special to each actuator and normally effective to retain the corresponding actuators in home position, said retaining means constructed and arranged to be rendered ineffective upon depression of a corresponding date key, the combination of an abutment on each actuator; year, month, and day stop members for the corresponding actuators, arranged in progressive stepped relationship to each other in the order named, said stop members normally in ineffective positions but movable increasing extents from ineffective position so as to become effective in progressive order to obstruct movement of the corresponding actuators from home position; control elements mounted on the traveling carriage in relation to preselected columnar positions thereof; and sensing means operatively connected to the stop members and coacting with the control elements to selectively control the extent of movement of said stop members to selectively determine whether the month, day, and year, the month and day, the day, or none of the date will be printed upon the record material.

4. In a machine of the class described having means to print the year, month, and day on record material and a traveling carriage for supporting the record material, said traveling carriage selectively movable to various columnar positions to present different portions of said record material to the printing means, the combination of several rows of depressible keys to set up the date; an actuator for each row of keys operatively connected to the printing means and movable from a home position to various positions under control of the corresponding depressible keys; retaining means for each actuator normally effective to retain the corresponding actuators in home position, said retaining means constructed and arranged to be rendered ineffective upon depression of a corresponding key; an abutment on each actuator; a stop member for each actuator, said stop members secured in stepped relationship to each other; means to move the stop members from normal ineffective position so as to progressively bring one after the other of said stop members into the path of the corresponding abutments to control which of the actuators will be positioned by the corresponding depressed keys; control elements mounted on the traveling carriage in relation to preselected columnar positions thereof; and sensing means operatively connected to the stop members and coacting with the control elements to control the extent of movement of said stop members in relation to their corresponding abutments to selectively control the printing of the date on the record material.

5. In a machine of the class described, constructed and arranged to print the date on record material, said machine having a plurality of rows of depressible date keys, an actuator for each row of date keys, said actuators movable from a home position to various positions corresponding to the depressed date keys, a printing sector for each row of date keys operatively connected to the corresponding actuators and positionable thereby to print the date on the record material, and a traveling carriage for supporting the record material in printing relationship to the printing sectors, said traveling carriage movable to various predetermined columnar positions, the combination of an abutment on each actuator; a stop member for coacting with each abutment, said stop members arranged in offset or stepped relationship to each other so as to progressively move into the path of the corresponding abutments; means to move the stop members from normal ineffective position into the path of the corresponding abutments; a plurality of control elements mounted on the traveling carriage in relation to preselected columnar positions thereof; and means connected to the stop members and coacting with the control elements to interrupt the movement of said stop members to determine which of said stop members will become effective to retain the corresponding actuators and printing sectors in home position to control the printing of the date.

6. In a date-printing device for a machine of the class described, the combination with depressible year, month, and day keys, year, month, and day actuators for the corresponding keys, said actuators movable from a home position to positions corresponding to the depressed date key, a printing sector for each actuator and positionable thereby for printing the date on record material, and a traveling carriage for supporting the record material in relation to the printing sectors, said traveling carriage movable to various preselected columnar positions, of an abutment on each actuator; a stop member for coacting with each abutment to retain the corresponding actuators in home position, said stop members fixed in offset or stepped relationship to each other so as to progressively move into the path of the corresponding abutments; means to move the stop members from normal ineffective position into the path of the corresponding abutments; control elements mounted on the traveling carriage in relation to predetermined columnar positions thereof, said control elements having date control surfaces thereon; and means connected to the stop members and coacting with the date control surfaces to control the extent of movement of said stop members in relation to the corresponding abutments to control the positioning of the actuators and the printing sectors by the depressed date keys, to determine whether all of the date, none of the date, or a part of the date will be printed on the record material.

7. In a machine of the class described, having a traveling carriage movable to various columnar positions, a single row of depressible keys comprising two separate groups for setting up different data, and a differential actuator for the one row of keys, said actuator movable from a normal ineffective position to various positions under control of the depressed keys, the combination of an abutment on the actuator; a stop member movable from a normal ineffective position into the path of the abutment; means operating under control of the traveling carriage in preselected columnar positions thereof for moving the stop member into the path of the abutment to selectively determine whether or not the actuator will be positioned under control of the depressed keys; and means including a slide operated by the depression of any key of one group, and coacting elements on said slide and the stop member for preventing movement of said stop member into the path of the abutment, to insure positioning of said actuator under control of the depressed keys of said one group.

8. In a machine of the class described, having a row of depressible keys comprising two distinct groups for setting up separate data, a differential actuator for the row of keys movable from a normal position to various positions under control of said keys, a printing sector operatively connected to the actuator and positively thereby, and a traveling carriage to support record material in printing relationship to the printing sector so that data corresponding to said two groups of keys may be printed on said record material, said traveling carriage selectively movable to various columnar positions, the combination of an abutment on the actuator; a stop member movable from a normal or ineffective position into coacting relationship with the abutment; means operating each machine operation and controlled by the traveling carriage in preselected columnar positions thereof to move the stop member from normal or ineffective position into the path of the abutment to selectively determine whether or not the actuator and the type carrier will be positioned under control of the depressed key; a slide operated by any one of the keys of one group when depressed; and coacting elements on the slide and the stop member for preventing movement of said stop member into the path of the abutment when any key of said one group is depressed.

9. In a machine of the class described, having a traveling carriage selectively movable to various columnar positions, a row of depressible keys comprising two different groups for setting up separate data, and a differential actuator for the row of keys, said actuator movable from a normal position to various positions under control of the two groups of keys, the combination of an abutment on the actuator; a stop member movable from a normal ineffective position into coacting relationship with the abutment; control elements mounted on the traveling carriage in relation to various columnar positions thereof; sensing means operatively connected to the stop member and coacting with the control elements to control the movement of the stop member into the path of the abutment to selectively determine whether or not the actuator will be positioned under control of the depressed keys; and means operative upon depression of the keys of one group to prevent movement of the stop member into the path of the abutment to insure positioning of the actuator under control of the depressed keys of said one group.

10. In a machine of the class described, having a row of depressible keys comprising two distinct groups for setting up separate data, a differential actuator for the row of keys movable from a normal position to various positions under control of the keys, a printing sector operatively connected to the actuator and positioned thereby, and a traveling carriage to support record material in printing relationship to the printing sector so that data corresponding to said two groups of keys may be printed on said record material, said traveling carriage selectively movable to various columnar positions, the combination of an abutment on the actuator; a stop member movable from a normal ineffective position into coacting relationship with the abutment; control elements mounted on the traveling carriage in relation to various columnar positions thereof; sensing means operatively connected to the stop member and coacting with the control elements to control the movement of said stop member into the path of the abutment to selectively determine whether or not the actuator will be positioned under control of the depressed keys; and means operative upon depression of the keys of one group to prevent movement of the stop member into the path of the abutment to insure positioning of the actuator under control of the depressed keys of said one group.

References Cited in the file of this patent

UNITED STATES PATENTS

| Number | Name | Date |
|---|---|---|
| 1,395,991 | Gascon | Nov. 1, 1921 |
| 1,901,372 | Landsiedel | Mar. 14, 1933 |
| 2,008,921 | Muller | July 23, 1935 |
| 2,284,886 | Vigborg | June 2, 1942 |